(12) United States Patent
Drexler

(10) Patent No.: US 10,384,813 B2
(45) Date of Patent: *Aug. 20, 2019

(54) SPACECRAFT LANDING AND SITE-TO-SITE TRANSPORT FOR A PLANET, MOON OR OTHER SPACE BODY

(71) Applicant: Jerome Drexler, Los Altos Hills, CA (US)

(72) Inventor: Jerome Drexler, Los Altos Hills, CA (US)

(*) Notice: Subject to any disclaimer, the term of this patent is extended or adjusted under 35 U.S.C. 154(b) by 235 days.

This patent is subject to a terminal disclaimer.

(21) Appl. No.: 15/614,086

(22) Filed: Jun. 5, 2017

(65) Prior Publication Data

US 2018/0134417 A1    May 17, 2018

Related U.S. Application Data

(60) Provisional application No. 62/422,676, filed on Nov. 16, 2016.

(51) Int. Cl.
*B64G 1/12* (2006.01)
*B64G 1/62* (2006.01)
(Continued)

(52) U.S. Cl.
CPC ............. *B64G 1/62* (2013.01); *B64G 1/002* (2013.01); *B64G 1/105* (2013.01); *B64G 1/408* (2013.01); *B64G 2001/1071* (2013.01)

(58) Field of Classification Search
CPC ........ B64G 1/409; B64G 1/407; B64G 1/408; F03H 3/00; F03H 1/00; F03H 99/00
See application file for complete search history.

(56) References Cited

U.S. PATENT DOCUMENTS 9,068,562 B1 *  6/2015  Budica ............... F03H 1/00
2006/0126771 A1 *  6/2006  Da Conceicao ...... F03H 1/00
                                                         376/100
(Continued)

FOREIGN PATENT DOCUMENTS

CA        2153406 A1    7/1994
JP       H08211190 A    8/1996
(Continued)

OTHER PUBLICATIONS

Beals et al., "Project Longshot: An Unmanned Probe to Alpha Centauri", U.S. Naval Academy, Report for 1987-1988, 74 pages.
(Continued)

*Primary Examiner* — J. Woodrow Eldred
(74) *Attorney, Agent, or Firm* — Thomas Schneck; Mark Protsik

(57) ABSTRACT

A method, operable in the presence of ambient cosmic rays, is provided for braking a craft upon approach to a planet, moon or other space body, e.g. in preparation for landing. Deuterium-containing particle fuel material is projected in a specified direction outward of the craft, which interacts with both the cosmic rays and their principal decay product muons to generate energetic micro-fusion products that produce a braking thrust on the craft for a specified trajectory. The micro-fusion products may push directly against the craft, e.g. upon a pressure plate, or upon a sail or parachute connected to the craft, to decelerate the craft. A prepositioned automated landing system at a landing site may project the fuel material toward the craft based on telemetry tracking of an incoming craft and likewise directly disperse the material cloud to form a braking cushion at the landing site. The micro-fusion landing system may be part of a site-to-site transport, where the craft was launched using
(Continued)

either conventional chemical rockets or micro-fusion for accelerating thrust.

20 Claims, 6 Drawing Sheets

(51) Int. Cl.
*B64G 1/10* (2006.01)
*B64G 1/00* (2006.01)
*B64G 1/40* (2006.01)

(56) References Cited

U.S. PATENT DOCUMENTS

| 2008/0123793 | A1 | 5/2008 | Loan et al. | |
|---|---|---|---|---|
| 2009/0000268 | A1* | 1/2009 | Yurash | B64G 1/405 60/202 |
| 2015/0098543 | A1* | 4/2015 | Cohen | B64G 1/408 376/131 |
| 2018/0033496 | A1* | 2/2018 | Sedwick | G21B 1/15 |

FOREIGN PATENT DOCUMENTS

| WO | WO9013125 | A1 | 11/1990 |
|---|---|---|---|
| WO | WO9222909 | A1 | 12/1992 |
| WO | WO2014114986 | A1 | 7/2014 |

OTHER PUBLICATIONS

J.J. Hopkins Laboratory for Pure and Applied Science, General Atomic division of General Dynamics, "Nuclear Pulse Space Vehicle Study", Chapter 2, Sep. 19, 1964, 30 pages.
Martin et al., "Project Daedalus: The Propulsion System—Part 1: Theoretical Considerations and Calculations", 1978, scan copy, 49 pages.
Schmidt et al., "Nuclear Pulse Propulsion—Orion and Beyond", 36th AIAA/ASME/SAE/ASEE Joint Propulsion Conference & Exhibit, Jul. 16-19, 2000, https://ntrs.nasa.gov/archive/nasa/casi.ntrs.nasa.gov/20000096503.pdf>.
SpaceX, "First-stage landing—Onboard camera", YouTube, May 27, 2016, 1 page, https://youtu.be/4jEz03Z8azc>.
Aguilar et al., "Precision Measurement of the Proton Flux in Primary Cosmic Rays from Rigidity 1 GV to 1.8 TV with the Alpha Magnetic Spectrometer on the International Space Station", Physical Review Letters, PRL 114, 171103, May 1, 2015, 9 pages.
Alvarez et al., "The Catalysis of Nuclear Reactions by mu Mesons", Lawrence Berkeley National Laboratory, Dec. 10, 1956, 5 pages.
Nakamura et al. (revised by Beatty et al.), "Cosmic Rays", JP G 37, 075021, Feb. 16, 2012, 21 pages.
Hassler et al., "Mars' Surface Radiation Environment Measured with the Mars Science Laboratory's Curiosity Rover", Science, Nov. 12, 2013, 35 pages.
Jackson, "A Personal Adventure in Muon-Catalyzed Fusion", Physics in Perspective 12, 2010, pp. 74-88.
Jackson, "Muon Catalysis of Fusion: A Commentary", Lawrence Berkeley Laboratory, Physics Division, Aug. 1984, 12 pages.
Kaye & Laby, NPL, "Cosmic Rays", 4 pages, http://www.kayelaby.npl.co.uk/general_physics/2_7/2_7_7.html.
Kaye & Laby, NPL, "Nuclear Fusion", 9 pages, http://www.kayelaby.npl.co.uk/atomic_and_nuclear_physics/4_7/4_7_4.html.
Cucinotta et al., "Space Radiation Cancer Risk Projections and Uncertainties—2012", NASA/TP-2013-217375, Jan. 2013, chapter 2—pp. 9-41.
Nuclear Power, "Photoneutrons", Nov. 3, 2015, 3 pages, https://www.nuclear-power.net/nuclear-power/fission/delayed-neutrons/photoneutrons/>.
U.C. Berkeley Physics 250, "Cosmic Rays", Neutrino/Nuclear Astrophysics, Spring 2011, Class Notes, Chapter 9, pp. 1-36, available from Univ. of Washington, www.int.washington.edu/PHYS554/2011/chapter9_11.pdf.

\* cited by examiner

SPACECRAFT LANDING AND SITE-TO-SITE TRANSPORT FOR A PLANET, MOON OR OTHER SPACE BODY

CROSS-REFERENCE TO RELATED APPLICATION

This application claims priority under 35 U.S.C. 119(e) from prior U.S. provisional application 62/422,676 filed Nov. 16, 2016.

TECHNICAL FIELD

The present invention relates to methods and systems providing decelerating thrust in preparation for landing a craft upon a surface of a planet, moon or other space body and to corresponding systems for transport by craft from one base or site to another, including planets such as Mars having a weak atmosphere. The invention also relates to inducement of controlled muon-catalyzed nuclear micro-fusion and particle-target micro-fusion to generate thrust-producing micro-fusion products.

BACKGROUND ART

On several occasions, spacecraft landers or probes attempting to land onto a planet surface have crashed with a total loss of the equipment. This has been especially true for missions to Mars. The distance between Earth and Mars results in a communications time delay of about 20 minutes in each direction, such that the lander must act autonomously, based solely on pre-loaded software and parameters. Every potential failure mode must be anticipated by the design team and appropriate responses determined and programmed in advance.

Landing a large mass on Mars is particularly challenging. The atmosphere of Mars is too thin for aerobraking and parachutes alone to be effective, while remaining thick enough to create stability and impingement problems when decelerating with retro-rockets. Parachutes, thrusters, and airbags, either on their own or in combination, which were employed for the successful landings of the Sojourner, Spirit and Opportunity rovers, all less than 200 kg, don't work for landing payloads of one metric ton or more on Mars. Viking 1 and 2 landers (572 kg) and the Curiosity rover (899 kg) have used a combination of heat shields and thrusters. The Curiosity rover finished its descent using a rocket-powered sky crane system, rather than the airbags used with lighter rovers. Proposed craft for future manned landings upon Mars have an overall payload of 100 metric tons. Such a vehicle is too massive to rely upon parachutes and/or a "sky crane" tethered system to descend to the Martian surface. Supersonic retro-propulsion using thrust from large rocket engines are expected to do the job.

In December 1999, a landing attempt by NASA of the Mars Polar Lander suffered from a premature shutdown of its descent engine just prior to the lander touching the surface, causing it to strike the planet at a high velocity (about 80 kph). In that case, a software error incorrectly interpreted vibrations from deployment of the stowed legs as a surface touchdown while the lander was still 40 meters above the surface. In the same mission, two Deep Space 2 hard penetrator probes failed to survive a planned impact. More recently, the Schiaparelli Entry, Descent and Landing Demonstrator Module (EDM) portion of the ExoMars project, a joint mission of the European Space Agency (ESA) and the Russian space agency Roscosmos, crashed on 19 Oct. 2016. Early indications are that the deployed parachute was ejected too soon, and rocket thrusters shut off prematurely, firing for only 3 seconds instead of the expected 30 seconds, such that the lander impacted the Martian surface at near terminal velocity (about 300 kph). Although the lander crashed, ESA officials nevertheless declared Schiaparelli a partial success because it had fulfilled its primary function of testing the landing system for the ExoMars 2020 surface platform and returning telemetry data during its descent.

Overall, the Mars lander missions to date have achieved success only about half the time. More launches for Mars lander missions are planned for April/May 2018, the next favorable launch window, and again for July-September 2020. Unmanned missions to Phobos (a Mars moon), Europa (a moon of Jupiter), and other space bodies (such as asteroids) are planned.

The United States has committed NASA to a long-term goal of human spaceflight and exploration beyond low-earth orbit, including crewed missions toward eventually achieving the extension of human habitation on another celestial body (e.g., the Moon, Mars). There have also been private proposals to send manned space vehicles to Mars by 2025. One such development project is the Mars Colonial Transporter by the private U.S. company SpaceX with plans for a first launch in 2022 followed by flights with passengers in 2024.

This research and development activity is expected to proceed in several general stages, beginning with an Earth-reliant stage with research and testing on the ISS of concepts and systems that could enable deep space, long-duration crewed missions, followed by a proving ground stage in cis-lunar space to test and validate complex operations and components before moving on to largely Earth-independent stages. An Earth-independent stage is planned for Mars orbit, tentatively including a phase for perfecting a Mars lander suitable for human-scale landings, an ascent vehicle to reach orbit from the Mars surface, and a possible Mars orbital transport vehicle or "taxi" for transportation between a long-duration Martian surface habitat and the Mars' moons or low Mars orbit.

The negative impact of any lander failure in such a manned mission upon public opinion and investor confidence would likely be an enormous setback to space exploration. Even the landings that inadvertently crashed were timed, as best as possible, for near ideal surface conditions. Eventually, however, landings will be required during all seasons, even where the landing conditions are less than optimal. For example, on Mars, during certain seasons when $CO_2$ dry ice in one or the other polar ice cap is rapidly sublimating into the Martian atmosphere, surface winds are created that can adversely impact upon landing craft descent and drift, adding to landing risk or missing the targeted landing site by many kilometers. At such times, lander reliability is particularly important. Hence, space agencies and private space companies are continuing to seek ever more reliable landing systems to minimize the possibility of such an occurrence.

Once on Mars, transport from one base or site to another would be complicated by Martian surface conditions. Due to the thin atmosphere of Mars (with a pressure of merely 0.6% that on Earth), air transport by way of airplane or helicopter are impossible, even with Mars' lower gravity (38% of that on Earth), because of insufficient lift. This leaves fewer forms of transportation on Mars (e.g., rovers) or various launch and re-entry schemes. The latter could be rocket-powered or ballistic, and orbital or sub-orbital. Due to the current failure rate of lander missions to date, landing systems would need to be significantly improved before launch-and-reentry type transport schemes could become commonplace.

Several projects have explored the possibility of nuclear spacecraft propulsion. The first of these was Project Orion from 1958-1963 built upon general proposals in the 1940s by Stanislaw Ulam and others, in which external atomic detonations would form the basis for a nuclear pulse drive. Later, between 1973 and 1978, Project Daedalus of the British Interplanetary Society considered a design using inertial confinement fusion triggered by electron beams directed against fuel pellets in a reaction chamber. From 1987 to 1988, Project Longshot by NASA in collaboration with the US Naval Academy developed a fusion engine concept also using inertial confinement fuel pellets but this time ignited using a number of lasers. All of these projects have focused on its use for propulsion in interplanetary space. Naturally, these last two projects depend upon successfully achieving nuclear fusion. Additionally, the atomic detonations of the type proposed in the Orion project are wholly unsuitable for use in landing a spacecraft on a planetary surface because of dangers inherent in high-energy detonations near the landing site and from potential contamination of the site itself.

Muon-catalyzed fusion was observed by chance in late 1956 by Luis Alvarez and colleagues during evaluation of liquid-hydrogen bubble chamber images as part of accelerator-based particle decay studies. These were rare proton-deuteron fusion events that only occurred because of the natural presence of a tiny amount of deuterium (about one part per 6400) in the liquid hydrogen. It was quickly recognized that fusion many orders of magnitude larger would occur with either pure deuterium or a deuterium-tritium mixture. However, John D. Jackson (Lawrence Berkeley Laboratory and Prof. Emeritus of Physics, Univ. of California, Berkeley) correctly noted that for useful power production there would need to be an energetically cheap way of producing muons. The energy expense of generating muons artificially in particle accelerators combined with their short lifetimes has limited its viability as an earth-based fusion source, since it falls short of break-even potential.

Another controlled fusion technique is particle-target fusion which comes from accelerating a particle to sufficient energy to overcome the Coulomb barrier and interact with target nuclei. To date, proposals in this area depend upon using some kind of particle accelerator. Although some fusion events can be observed with as little as 10 KeV acceleration, fusion cross-sections are sufficiently low that accelerator-based particle-target fusion are inefficient and fall short of break-even potential.

It is known that cosmic rays are abundant in interplanetary space. Cosmic rays are mainly high-energy protons (with some high-energy helium nuclei as well) with kinetic energies in excess of 300 MeV. Most cosmic rays have GeV energy levels, although some extremely energetic ones can exceed $10^{18}$ eV. FIG. 8 shows cosmic ray flux distribution at the Earth's surface after significant absorption by Earth's atmosphere. In near-Earth space, the alpha magnetic spectrometer (AMS-02) instrument aboard the International Space Station since 2011 has recorded an average of 45 million fast cosmic ray particles daily (approx. 500 per second within that instrument's effective acceptance area and measurement energy range). The overall flux of galactic cosmic ray protons (above earth's atmosphere) can range from a minimum of 1200 $m^{-2}s^{-1}sr^{-1}$ to as much as twice that amount. (The flux of galactic cosmic rays entering our solar system, while generally steady, has been observed to vary by a factor of about 2 over an 11-year cycle according to the magnetic strength of the heliosphere.) In regions that are outside of Earth's protective magnetic field (e.g. in interplanetary space), the cosmic ray flux is expected to be several orders of magnitude greater. As measured by the Martian Radiation Experiment (MARIE) aboard the Mars Odyssey spacecraft, average in-orbit cosmic ray doses were about 400-500 mSv per year, which is an order of magnitude higher than on Earth.

Cosmic rays are known to generate abundant muons from the decay of cosmic rays passing through Earth's atmosphere. Cosmic rays lose energy upon collisions with atmospheric dust, and to a lesser extent atoms or molecules, generating elementary particles, including pions and then muons, usually within a penetration distance of a few cm. Typically, hundreds of muons are generated per cosmic ray particle from successive collisions. Near sea level on Earth, the flux of muons generated by the cosmic rays' interaction by the atmosphere averages about 70 $m^{-2}s^{-1}sr^{-1}$. The muon flux is even higher in the upper atmosphere. These relatively low flux levels on Earth reflect the fact that both Earth's atmosphere and geomagnetic field substantially shields our planet from cosmic ray radiation. Mars is a different story, having very little atmosphere (only 0.6% of Earth's pressure) and no magnetic field, so that muon generation at Mars' surface is expected to be very much higher than on Earth's surface.

SUMMARY DISCLOSURE

The present invention provides methods using micro-fusion engines for braking or decelerating spacecraft to an extent that facilitates a soft landing upon the surface of a planet (e.g. Mars), moon or other space body. In particular, the present invention is a braking, landing and site-to-site transport technology that takes advantage of the abundance of cosmic rays available for free and the abundance of muons generated from such cosmic rays on or near planets, moons and other space bodies with weak (or no) magnetic field and a thin (or no) atmosphere to catalyze micro-fusion events sufficient to produce braking thrust to slow a craft in preparation for a successful landing on their surface. Because the ambient cosmic rays and muons are available here for free in much larger quantities than on Earth, they do not need to be generated artificially in an accelerator. Thus, the invention provides a basic tool using micro-fusion for missions beyond Earth-orbit, such as a mission to Mars. Since the amount of energy needed for thrust is generally much less than the multi-kiloton yields of atomic weapons, "micro-fusion" is the term used here to refer to fusion energy outputs of not more than 10 gigajoules per second (2.5 tons of TNT equivalent per second), to thereby exclude macro-fusion type explosions.

One way to achieve this decelerating or braking micro-fusion thrust is to disperse micro-fusion fuel target material (pellets, chips or powder) forward of the craft itself (or beneath for landing), which fuel material will then interact with the incoming flux of cosmic rays and muons, thereby producing a combination of particle-target micro-fusion and/or muon-catalyzed micro-fusion. The cosmic ray particle or muon triggered micro-fusion events create a high velocity wind of alpha particles (helium nuclei) as fusion reaction products. An external pusher configuration similar that proposed for Project Orion could be used to receive the thrust, except that here controlled micro-fusion events, not atomic explosions, are the source of that thrust. Additionally, a parachute (or "sail", similar to a balloon jib on sailing vessels) that is attached to the craft will significantly increase the collection area for the micro-fusion reaction products (alpha particles), thereby increasing the amount of available braking thrust. The micro-fusion products interact with the craft or parachute/sail, thereby generating a decelerating thrust against vehicle, slowing its approach to a planet, moon or other space body in preparation for landing.

A parachute system could be also deployed to receive the micro-fusion-generated "helium wind" as a landing craft approaches the surface of the planet, moon or space body in a final landing sequence. Vertically-directed alpha particle fusion products apply upward pressure against the parachute, slowing the descent and softening the landing of the craft, e.g. onto the Martian surface. The parachute, could be given a positive charge, either artificially or by interaction with Martian dust, to further enhance the pressure-providing repulsive interaction of the "helium wind". Still further, if the hot helium products can be retained long enough beneath the parachute, it can also begin to act, at least partially, like a balloon.

In yet another embodiment, an automated landing system (providing for human intervention only as a backup or for emergencies) can be based upon the micro-fusion for achieving a safe landing. In particular, the landing system could be pre-positioned at one or more desired landing sites on the surface of the planet or space body. The landing system would include a radar subsystem to track the arriving craft, precisely measuring its altitude, velocity, trajectory, and rate of change of these parameters. Using those measurements, the landing system could then launch a sequence of micro-fusion fuel packages from the landing site (or nearby) to specified locations directly in the craft's incoming flight path, then disperse the cloud of micro-fusion target material to generate the desired braking thrust upon the craft as it approaches the landing site.

The deuterium-containing "fuel" for the particle-target and/or muon-catalyzed micro-fusion may be supplied in the form of solid $Li^6D$ as chips, pellets or powder. Muon-created muonic deuterium and lithium-6 can come much closer to the nucleus of a neighboring atom with a probability of fusing the nuclei, releasing energy. Once a muonic molecule is formed, fusion proceeds extremely rapidly (~$10^{-10}$ sec). One cosmic ray particle can generate hundreds of muons, and each muon can typically catalyze about 100 micro-fusion reactions before it decays (the exact number depending on the muon "sticking" cross-section to any helium fusion products). For example, a desired reaction is $Li^6+D \rightarrow 2He^4+22.4$ MeV, where much of the useful excess energy is carried as kinetic energy of the two helium nuclei (alpha particles). Additionally, any remaining cosmic rays can themselves directly stimulate a micro-fusion event by particle-target fusion, wherein the high energy cosmic ray particles (mostly protons, but also helium nuclei) bombard relatively stationary target material. When bombarded directly with cosmic rays, the lithium-6 may be transmuted into tritium which could form the basis for some D-T micro-fusion reactions. Other forms of target fuel material might include heavy water ($D_2O$) or liquid deuterium ($D_2$) to produce D-D micro-fusion reactions.

The present invention achieves nuclear micro-fusion using deuterium-containing target material and the ambient flux of cosmic rays and generated muons that are already naturally present in the extraterrestrial environment at much higher concentrations than on Earth. The optimum concentration of the target material for the particle-target and muon-catalyzed micro-fusion may be determined experimentally based on the abundance of cosmic rays with a view to maintaining billions of micro-fusion events at a rate adequate for generating the desired braking thrust, while avoiding any possibility of a runaway macro-fusion event.

At a minimum, since both particle-target micro-fusion and muon-catalyzed micro-fusion, while recognized, are still experimentally immature technologies (since measurements have only been conducted to date on Earth using artificially accelerated particles and generated muons from particle accelerators), various embodiments of the present invention can have research utility to demonstrate feasibility of achieving adequate thrust in environments beyond Earth's protective atmosphere and/or geomagnetic field, initially above Earth's atmosphere (e.g. on satellite platforms) for trial purposes, and then on the Moon or the surface of Mars, in order to determine optimum parameters for braking and landing in those environments. For example, the actual number of micro-fusion reactions for various types of fusion fuel sources and target configurations, and the amount of rocket thrust that can be derived from such reactions and their fusion products, are still unknown and need to be fully quantified to improve the technology.

DETAILED DESCRIPTION

Figure 1:
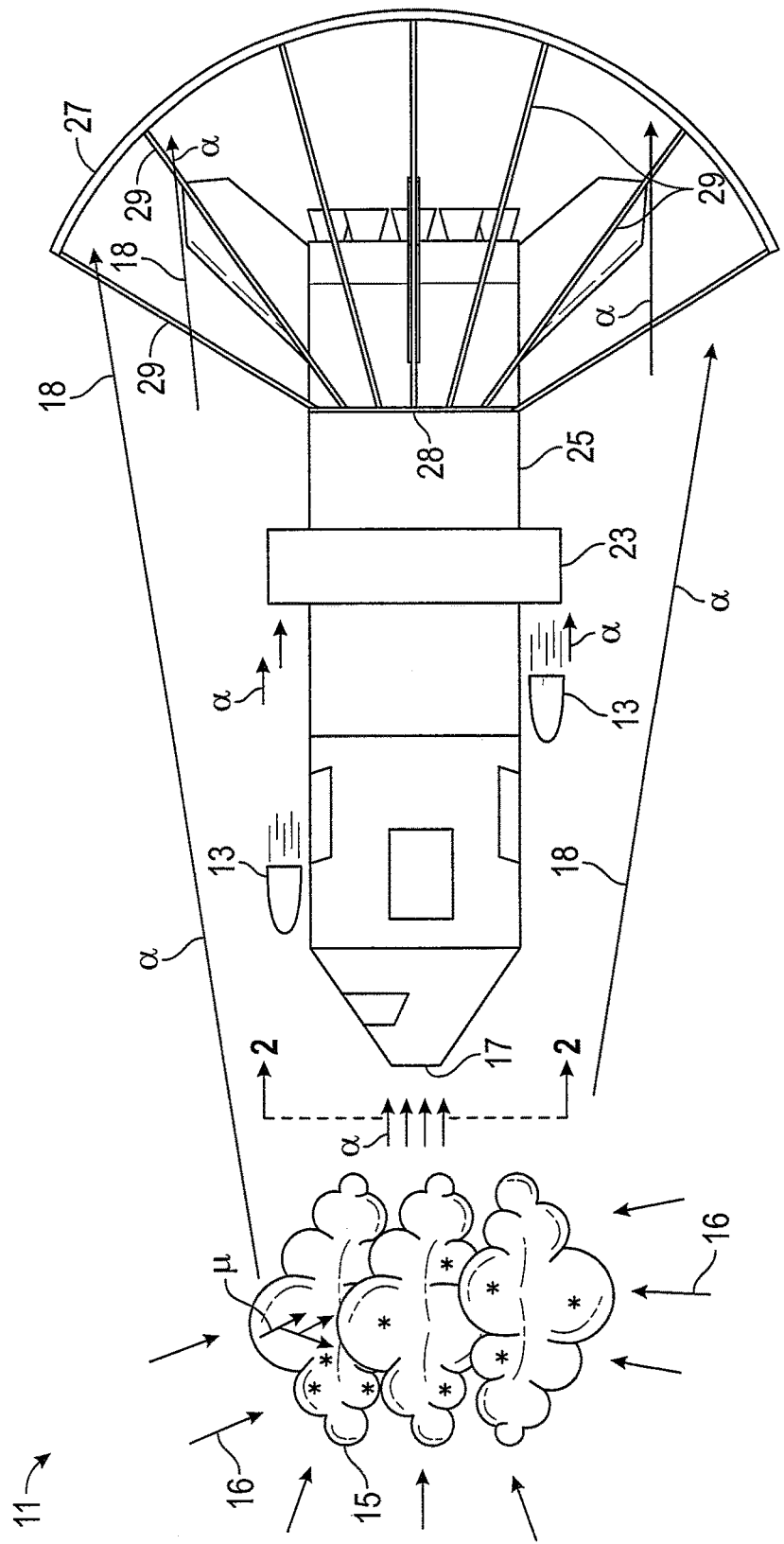
FIG. 1 is an embodiment of a spacecraft using cosmic-ray/muon-catalyzed micro-fusion propulsion for braking on approach to a planet, moon or other space body, in accord with the present invention. A deployed sail is seen attached to spacecraft to increase retro-thrust-producing interaction area for receiving the kinetic-energy-bearing micro-fusion products.

With reference to FIG. 1, a decelerating or braking technique for a spacecraft 11 on approach to a planet, moon or other space body is seen. A series of projectiles 13 containing micro-fusion target material (chips, pellets, powder), e.g. once every minute or more frequently, are shot externally ahead of the craft 11 (i.e. in the flight path) by the spacecraft. The craft's own landing system may employ radar determination of the craft trajectory in relation to a selected landing area of the space body to direct the projectiles 13 to specified locations ahead of the craft that will produce a desired braking thrust vector. Alternatively, one or more landing areas on surface of the space body may have an automated landing system pre-positioned on that body (i.e. separate from the landing craft) with the necessary fuel projectiles that can then be shot just ahead of the craft based on radar determinations by that landing system. This would eliminate the need for the landing craft to carry any of the fuel projectiles themselves, except for backup or emergencies.

The projectiles 13 disperse the fusion material as a localized cloud 15, much like fireworks or artillery from an antiaircraft gun, which then will interact with the ambient flux of cosmic rays 16 (and with muons generated by interaction of cosmic rays with dust in space and particles in the cloud), such that some combination of particle-target micro-fusion and/or muon-catalyzed micro-fusion will take place, generating a decelerating or braking thrust against the vehicle 11.

The fuel can be solid Li$^6$D in powder form, D-D or D-T inertial-confinement-fusion-type pellets, or $D_2O$ ice crystals, or even droplets of (initially liquid) $D_2$. Stored fuel packages will be shielded to reduce or eliminate premature micro-fusion events until delivered and dispersed as a cloud 15 in front of the spacecraft for deceleration thrusting. An interplanetary astronaut crew will itself need shielding from radiation and the crew's shielding could double as a shield for the fuel packages also. One important source of such shielding will be the spacecraft's water supply, which should be adequate for the task. One need not eliminate cosmic rays or their secondary particles (pions, muons, etc.) to zero, but merely reduce their numbers and energies sufficiently to keep them from catalyzing large numbers of micro-fusion events in the stored target particle material. Additionally, since the use of micro-fusion fuel is expected to reduce the required amount of chemical rocket propellant by about a factor of two, one can easily afford the extra weight of some small amount of metal for shielding, if needed. (For example, the Juno unmanned spacecraft to Jupiter contains radiation vaults of 1 cm thick titanium to shield its electronics from external radiation. A similar type of vault might be used in this case for shielding the stored fuel projectiles.) After being shot from the spacecraft 11, the casing of the projectiles 13 themselves will continue to provide some shielding until dispersal of the target particle material as a cloud 15.

Figure 2:
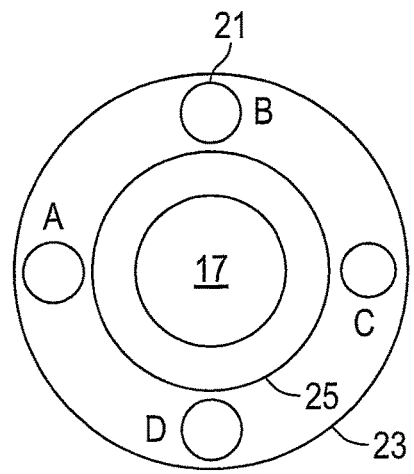
FIG. 2 is a front-end view of the spacecraft of FIG. 1 prior to deployment of the sail, illustrating one arrangement of guns for delivering projectiles containing micro-fusion target fuel particles to the front of the spacecraft.

As seen in FIGS. 1 and 2, a ring extension 23 may be supplied around the perimeter 25 of the craft 11 to increase the thrusting area and for storage and delivery of the fusion fuel projectiles or "shells" 13 using a set of four or more (possibly one hundred) "guns" or tubes 21 (labeled here as A through D) that fire or eject the projectiles 13 from the vehicle 11. The needed rate of firing depends on the amount of deceleration required, the amount of fusion obtained from the ambient flux of cosmic rays (and/or muons) 16, the dispersal rate of the fuel cloud 15 from in front of the craft 11, and the efficiency of the transfer of the micro-fusion products α into braking thrust, but could be expected to be as much as one shell every few seconds or every second for the duration of the braking period.

Soon after the projectile 13 has reached the desired distance from the spacecraft 11, the package releases its target material. For example, a chemical explosion can be used to locally disperse the fusion material. The dispersed cloud 15 of micro-fusion target material will be exposed to ambient cosmic rays 16 and muons (μ). To assist muon formation, the target package may contain up to 20% by weight of added particles of fine sand or dust. As cosmic rays 16 collide with micro-fusion target material and dust, they form muons μ that are captured by the deuterium and that catalyze fusion. Likewise, the cosmic ray collisions themselves can directly trigger particle-target micro-fusion. Various types of micro-fusion reactions may also occur, such as Li$^6$-D reactions, generally from direct cosmic ray collisions, as well as D-T, using tritium generated by cosmic rays 15 impacting the lithium-6. D-T reactions especially may be assisted by muon-catalyzed fusion. The volume of the continuous slow fusion creates high velocity fusion products 19 (fast alpha particles or helium "wind", etc.) that bombard the front 17 of the spacecraft 11, as well as its shell projectile extension 23 around the perimeter 25. The energetic alpha particle micro-fusion products (α) provide braking thrust against the craft 11. A large-diameter flat disc or pressure plate, like that conceived for the Orion project, can be mounted on the craft 11 to receive the fusion products α to maximize retro-braking from such direct interactions with the fusion products. Even the photon radiation generated in the micro-fusion reactions will apply some supplemental pressure to help decelerate the craft.

To further improve the interaction of generated micro-fusion products with the spacecraft 11, a sail 27 may be deployed from the spacecraft 11. This greatly increases the overall interaction area, such that many of the alpha particles α that miss the front 17 of the spacecraft 11 and miss the projectile gun extension 23 around the craft will still hit the sail 27 and thus contribute to the braking thrust. The sail 27 may be attached by tether lines 29 to a ring mount 28 on the craft 11. It could be deployed from one side of the craft and then expand open as the ring mount 28 expands around the perimeter 25 of the spacecraft 11 and uncoils the tether lines 29. Still other deployment methods could be used.

The amount of energy generated by the micro-fusion reactions, and the thrust the micro-fusion products produce, depends upon the quantity of fuel released and the quantity of available cosmic rays and muons in the ambient environment surrounding the craft. Assuming most of the energy can be captured and made available for thrust, particularly with the use of a sail 27, an estimated $10^{15}$ individual micro-fusion reactions (less than 1 μg of fuel consumed) per second would be required for 1 kW output. But as each cosmic ray can create hundreds of muons and each muon can catalyze about 100 reactions, the available cosmic ray flux in interplanetary space (known to be several orders of magnitude greater than on Earth) is believed to be sufficient for this rocket thrust purpose following research, development, and engineering efforts.

Figure 3:
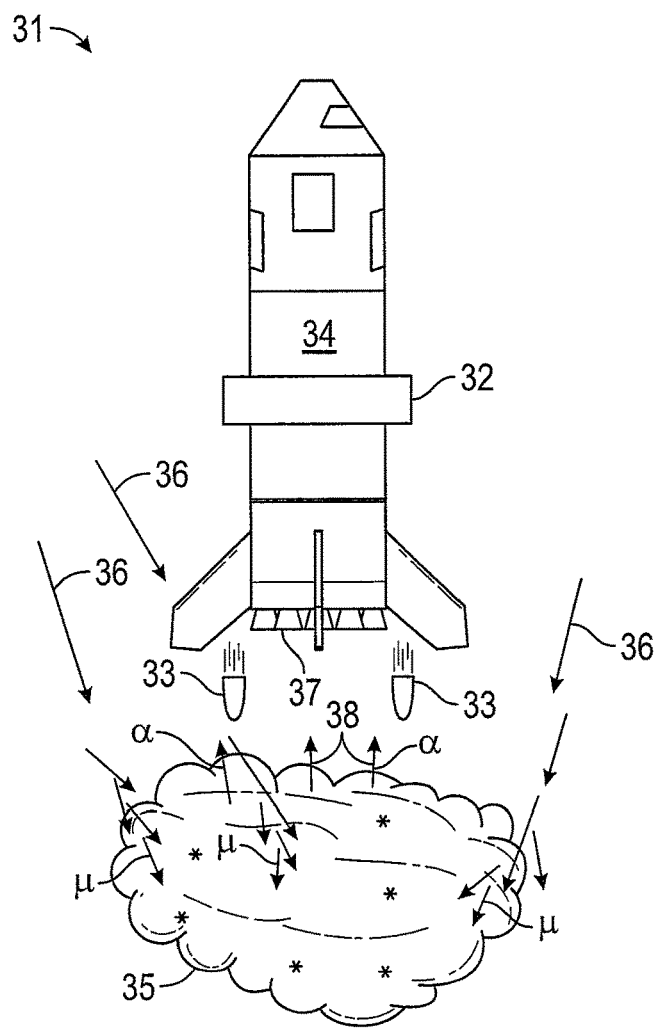
FIG. 3 is a first (direct-interaction) embodiment of a lander using the cosmic-ray/muon-catalyzed micro-fusion propulsion for retro-thrust.
Figure 4:
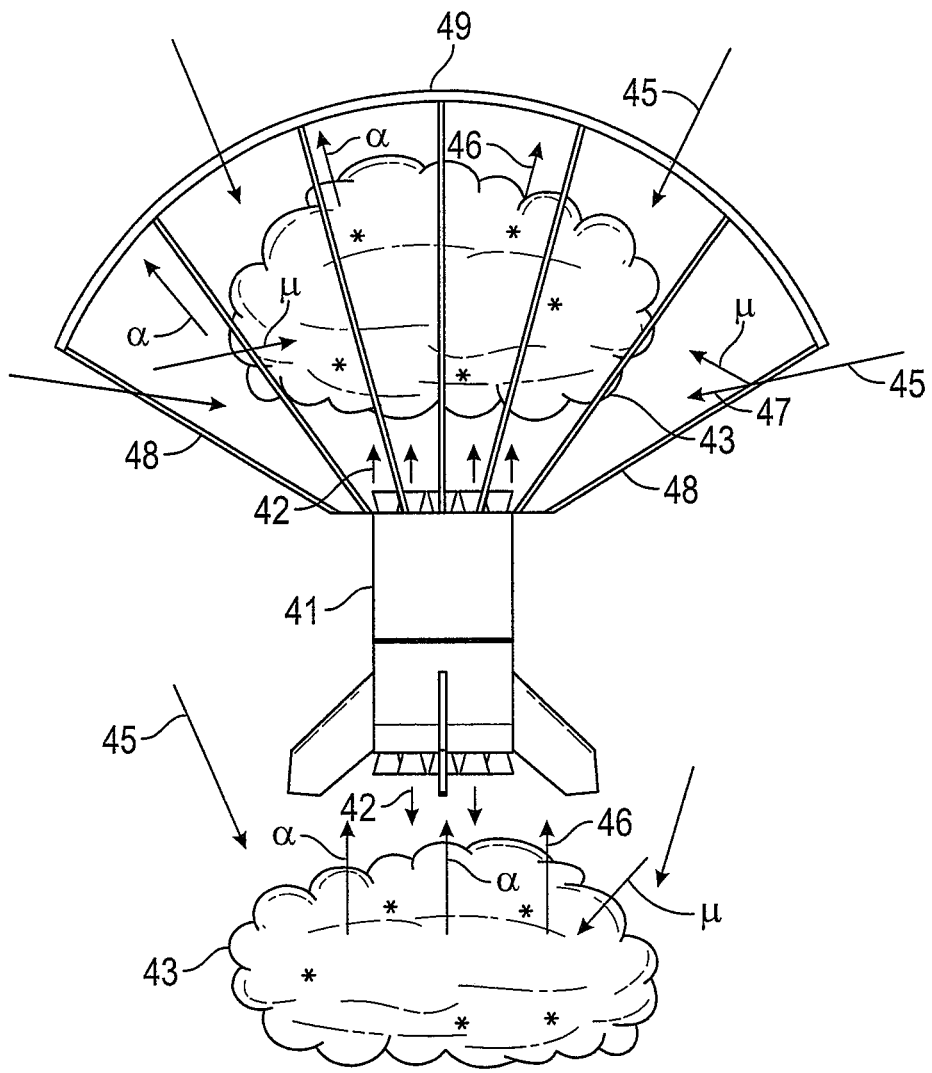
FIG. 4 is a second (parachute based) embodiment of a lander using the cosmic-ray/muon-catalyzed micro-fusion propulsion for retro-thrust.

FIGS. 3 and 4 adapt the scheme employed by the approaching spacecraft 11 of FIG. 1 to a landing craft. Accordingly, as seen in FIG. 3, one possible landing technique is to project micro-fusion target material, again dispersed from projectiles 33 shot downward from the descent or landing vehicle 31 by a ring of guns 32 around the vehicle perimeter or vehicle shell 34. The projectiles 33 chemically explode to create a cloud 35 of micro-fusion target fuel material that can interact with incoming cosmic rays 36 (and muons μ generated by interaction of the cosmic rays 36 with the planetary or lunar atmosphere and dust or with dust in the micro-fusion fuel cloud 35). Micro-fusion products (primarily fast alpha particles α) then provide braking thrust against the bottom 37 and ring 32 of the landing craft 31.

In another embodiment of a landing craft, shown in FIG. 4, micro-fusion products 46 (fast alpha particles or helium "wind") generated by the cosmic rays 45 and muons 47 interact with a parachute 49 deployed by a lander 41 to greatly slow the descent. The target fuel material 42 may be emitted from vents in the landing craft to create clouds 43 of fusion fuel material that interact with cosmic rays 45 and muons 47 to produce micro-fusion products (fast alpha particles). These high velocity helium nuclei 46 directed vertically into the parachute 49 apply pressure against the parachute 49 beyond that supplied by the thin Martian (or other planetary or lunar) atmosphere alone. The parachute 49 can be positively charged to give it a repulsive force against the generated fast alpha particles 46 and thereby increase the interaction efficiency. Such charge may be delivered from landing craft 41 through the parachute lines 48, or created from static interactions with Martian dust, or both. If the fast alpha particle (helium ion) products 46 can be contained long enough beneath the parachute 49, it may begin to act partially as a hot-air or helium balloon, further slowing the craft's descent. The braking provided using the parachute 49 may be supplemented, if desired, by additional micro-fusion reactions occurring directly beneath the landing craft 41, just as in FIG. 3.

In the first embodiment of FIG. 3, the reliance on a parachute 49 may be avoided where the fusion events are contained in a sufficiently localized cloud 35 that the fusion products 38 will push directly against the landing craft 31 itself. In the second embodiment of FIG. 4, assuming the deployed parachute 49 is large enough to capture the fast alpha particle fusion products 46, the cloud of micro-fusion target material 43 could be somewhat more dispersed. The parachute 49, connected to the landing craft 41 by tethers 48, provides a possible extra bonus of helium-balloon buoyancy or lifting action as long as a portion of the helium 46 generated by the micro-fusion can be contained for a time under the parachute 49.

Once landed on a space body, the vehicle 31 or 41 could be used for return to orbit or even for site-to-site transport. On Earth, airplanes take-off and land on a runway. On Mars, airplanes can't be used because the atmosphere is too thin to generate sufficient lift, even though gravity is only 38% that of Earth. However, the escape velocity for reaching orbit is comparably lower and sub-orbital or ballistic flights could be employed. While conventional chemical thrusting could be used for the ascent phase, the cosmic-ray or muon catalyzed micro-fusion provides thrust at least during the decelerating descent phase.

Figure 5:
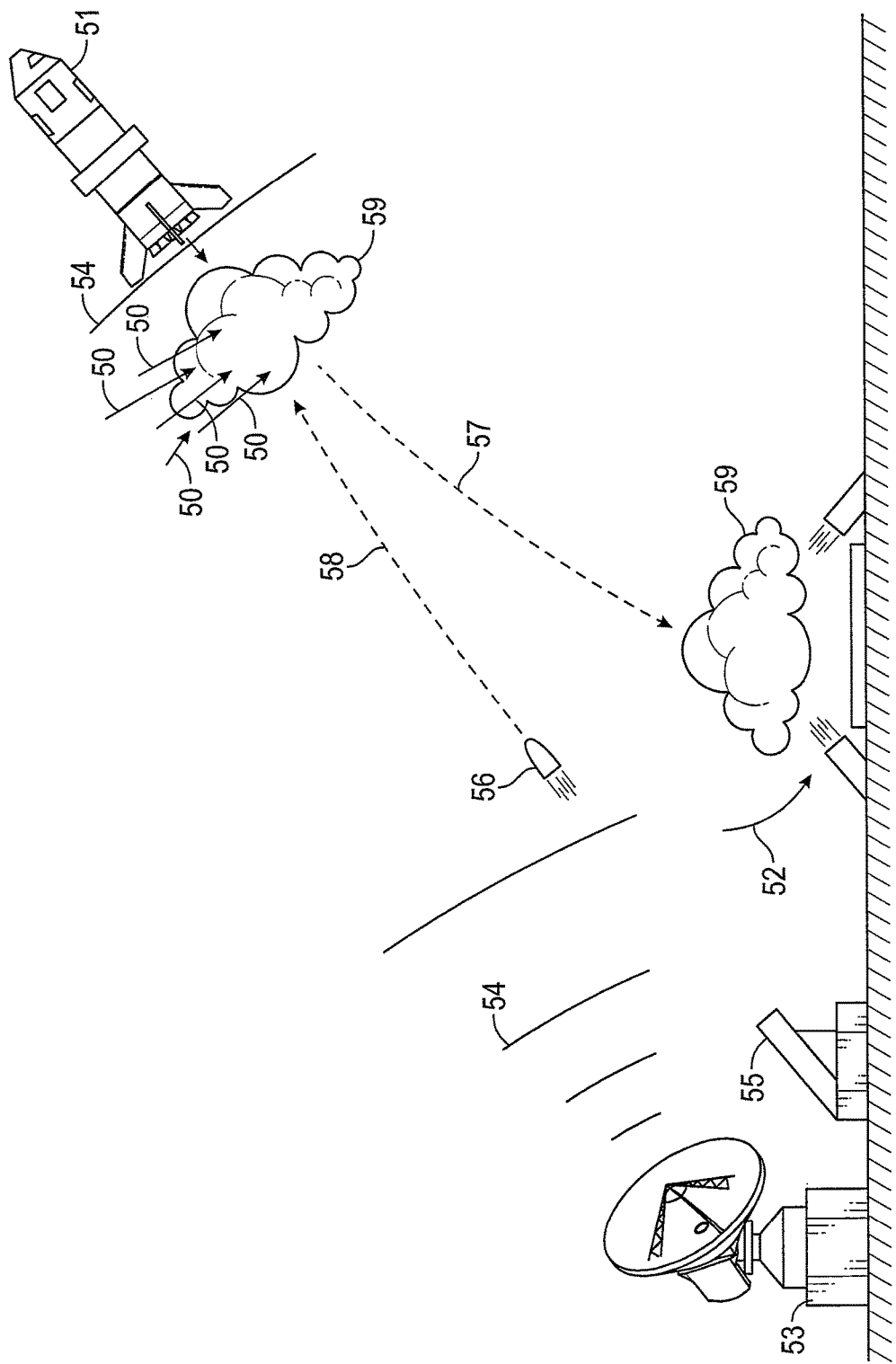
FIG. 5 is a schematic side view of an automated landing system based on pre-positioned equipment at a landing site for guiding and facilitating landing of incoming craft.

With reference to FIG. 5, an automated landing system (providing for human intervention only as a backup or for emergencies) can be based upon the micro-fusion for achieving a safe landing. As seen, the landing system has been pre-positioned at one or more desired landing sites on the surface of the planet or space body. The landing system would include a radar subsystem 53 to track the arriving craft 51, precisely measuring its altitude, velocity, trajectory, and rate of change of these parameters. Using those measurements, the landing system could then launch a sequence of micro-fusion fuel packages 56 from a gun 55 near the designated landing site 52. The shell projectile packages 56 are delivered along a trajectory 58 to specified locations directly in the craft's incoming flight path 57, then the projectile's contents are dispersed as a cloud 59 of micro-fusion target material to interact with incoming cosmic rays and muons to generate energetic fusion products that produce the desired braking thrust upon the craft 51 as it approaches the landing site 52.

Each landing site 52 would have a radar system 53 that emits directed radio energy 54 toward the incoming craft 51 and receive the reflected radio signal so as to determine altitude, trajectory, velocity, rate of change and other parameters needed to deliver micro-fusion fuel packages 56 to locations that will get the craft 51 safely to its landing site 52. The packages 56 and the micro-fusion fuel cloud 59 they release provide the needed retro-thrust or braking cushion to the craft 51. Additionally, the immediate landing site 52 may directly release a cloud of the micro-fusion material to create a retro-thrust landing cushion. The software program and its associated radar tracking equipment 53 and the gun (or guns) 55 directing the projectiles 56 together form an automated landing system that can have AI (e.g. self-learning) features, whereby each landing of a craft 51 is evaluated according to specified benchmarks, and then adjusted for subsequent landings to deliver more accurately the shell projectiles 56 that create the micro-fusion braking cushion. For example, the system may have the benefit of cosmic ray or muon flux measurements and local atmospheric conditions during a landing sequence and need to adjust the rate projectile firing to compensate for any change in these conditions.

Spacecraft that would be arriving at a planet, moon or other space body will decelerate in a braking phase to obtain orbit in preparation for landing. Landing sites will have been selected and have the automated landing systems set up in advance at each of them. The spacecraft may receive telemetry data from the landing systems of one or more landing sites so that its own flight parameters can be confirmed before beginning a landing sequence. Once a landing site is selected (and preferably a suitable back-up landing site as well), the spacecraft would use its own propulsion system to set up its initial trajectory for the landing. This could include, for example, an onboard ion propulsion system to steer the craft as needed. At the proper time, the two landing sites would turn on their micro-fusion landing cushions and confirm that they are working. When the craft comes in for a landing toward the primary landing site, if anything negative occurs, the craft, depending on its altitude, could instead launch its own micro-fusion cushion system, head for the backup landing site, or abort the landing and re-accelerate back into orbit.

Figure 6:
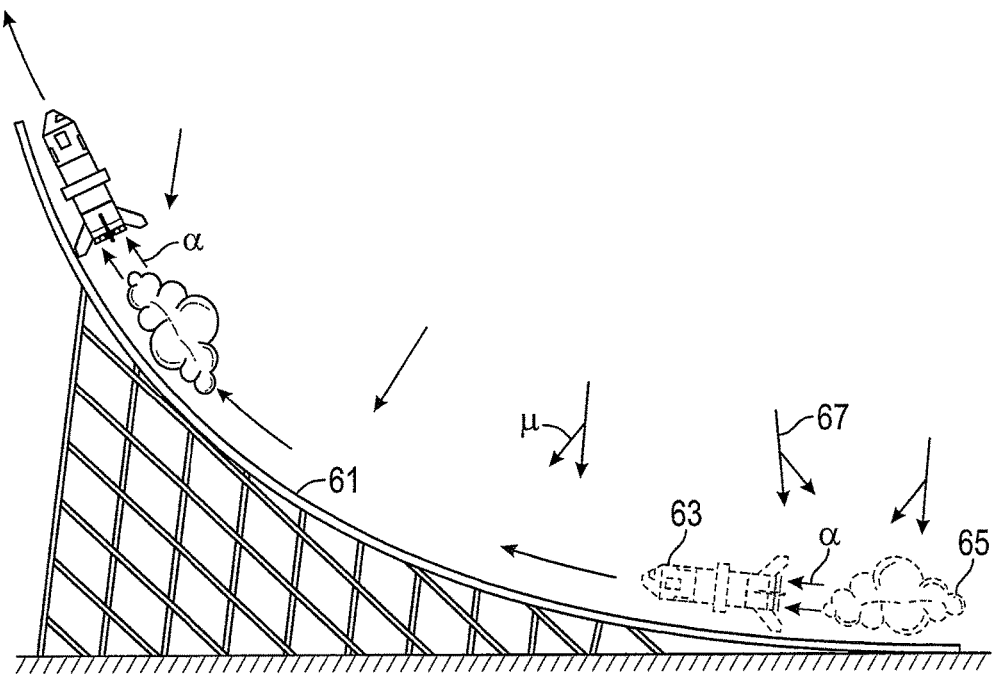
FIG. 6 is a site-to-site take-off track or ramp for accelerating a craft to escape velocity using the cosmic-ray/muon-catalyzed micro-fusion propulsion for thrust.

As another possible embodiment, one could build a take-off track or ramp 61, as seen in FIG. 6, e.g. about 1 to 3 kilometers long that curves upward toward the vertical. Such an arrangement could allow the vehicle 63 to accelerate to escape velocity, reach orbit and then transfer to a return vehicle going to the desired site. Or the track or ramp 61, provided it is oriented in the desired direction, could be used in sub-orbital mode to reach different bases (much like airports on Earth). The benefit is that, with micro-fusion target material 65 dispersed behind the vehicle 63, liquid chemical fuel is not needed for generating the thrust. The micro-fusion products themselves (helium ions) are not radioactive; so, provided the micro-fusion target material 65 is completely consumed by reactions with the cosmic ray and muon flux 67, there should be no lingering contamination near the launch site. Only radiation shielding for the launch need be provided to protect any surrounding habitations.

Figure 7:
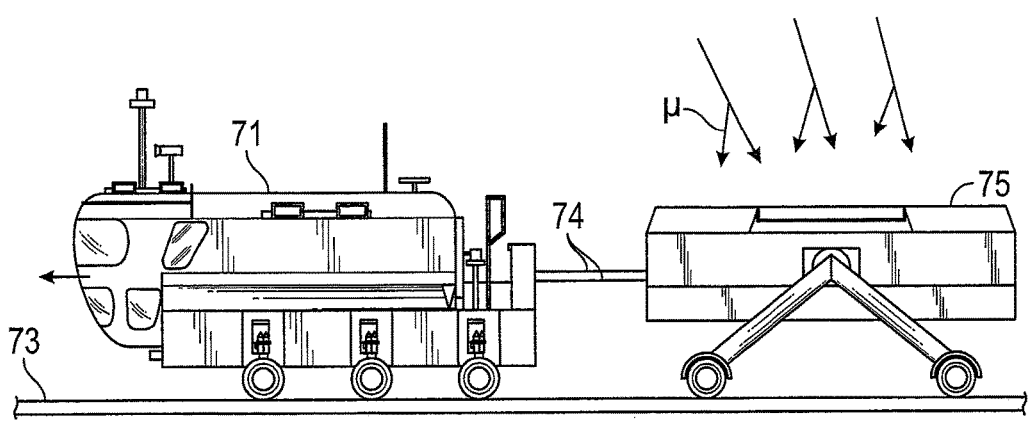
FIG. 7 is a local track-based vehicle and trailer with cosmic-ray/muon-catalyzed micro-fusion propulsion or electrical generation.
Figure 8:
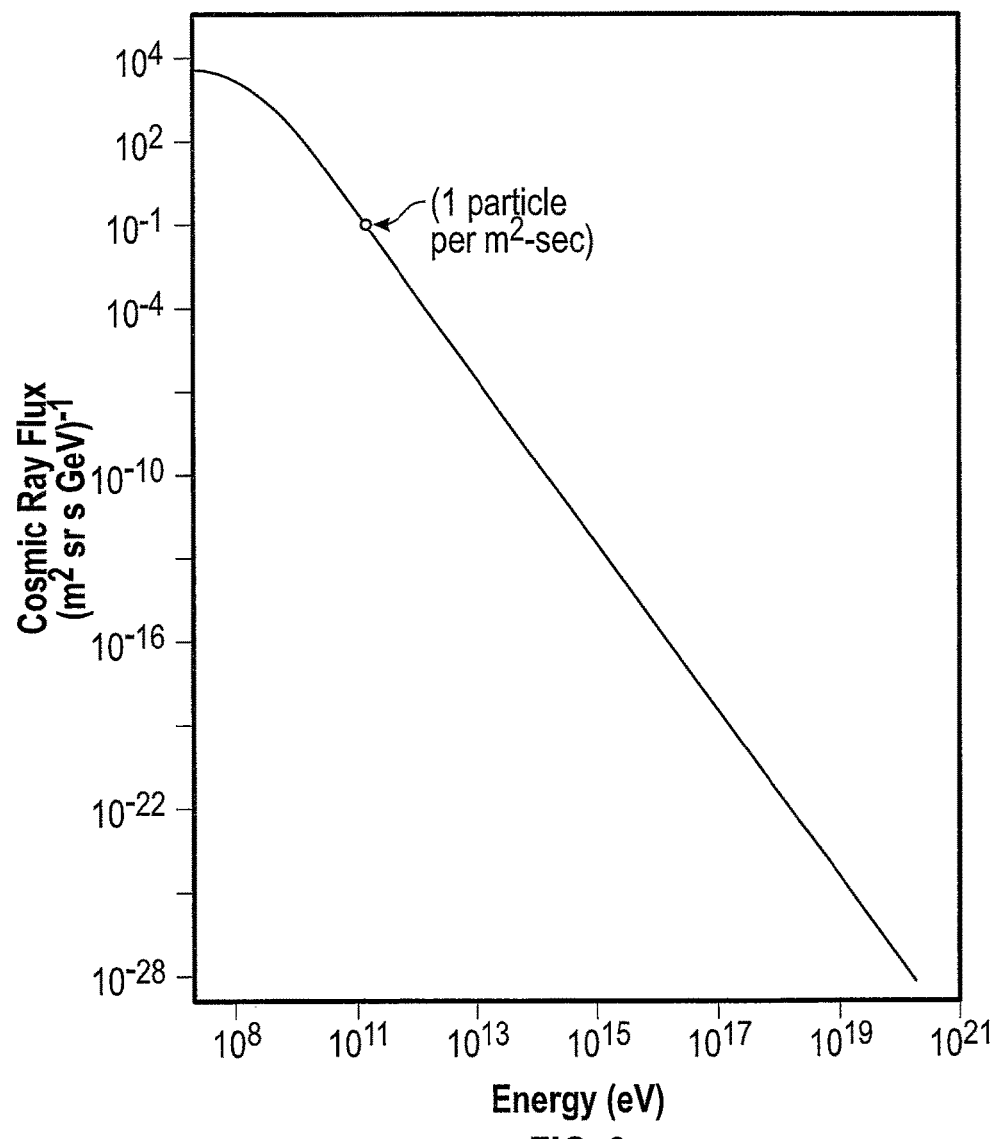
FIG. 8 is a graph of cosmic ray flux at the Earth surface versus cosmic ray energy, after very significant cosmic ray absorption by Earth's atmosphere has occurred.

In yet another embodiment shown in FIG. 7, the same cosmic-ray/muon micro-fusion propulsion and braking system could be used for certain frequent short trips to and from bases by land vehicles 71, including those riding on rails, tracks or guides 73, i.e. atomic "trolley" cars. Such trolley cars 71 may be equipped with a muon-based micro-fusion electrical generator or thruster on the roof of the vehicle (with adequate shielding) or in a separate trailer 75 riding on the same track 73 and connected by cable 74 some distance behind the trolley 71.

What is claimed is:

1. A method, operable in the presence of an ambient flux of cosmic rays, of braking a craft upon approach of a planet, moon or other space body, comprising:
   projecting deuterium-containing particle fuel material in a specified direction outward from a craft, the material interacting with the ambient flux of cosmic rays to generate products having kinetic energy; and
   receiving by the craft of at least some portion of the generated kinetic-energy-containing products in amounts sufficient to produce thrust directed generally away from the space body that decelerates the craft as it approaches the space body at a specified trajectory.

2. The method as in claim 1, wherein the deuterium-containing particle fuel material is projected in a direction of travel of the craft along the specified trajectory and the generated kinetic-energy-containing products push against the craft to slow its approach to the space body.

3. The method as in claim 2, wherein the craft has a pressure plate positioned to receive and be pushed upon by the generated kinetic-energy-containing products.

4. The method as in claim 1, wherein a sail attached to the craft is deployed over a specified area behind the craft to receive kinetic-energy-containing products that would otherwise miss the craft.

5. The method as in claim 1, wherein the craft is a landing craft on approach to a surface of the planet, moon or other space body.

6. The method as in claim 5, wherein the deuterium-containing particle fuel material is projected between the landing craft and a parachute connected to the craft, the generated kinetic-energy-containing products pushing against the parachute to generate a deceleration of the craft.

7. The method as in claim 6, wherein the parachute is positively charged.

8. The method as in claim 6, wherein the kinetic-energy-containing products comprise helium nuclei that are at least partially retained beneath the parachute.

9. The method as in claim 5, wherein the deuterium-containing particle fuel material is projected from a pre-positioned system at a landing site to a specified location outward from the craft such that the generated kinetic-energy-containing products pushing against the craft produce braking thrust according to a desired craft trajectory toward the landing site.

10. The method as in claim 9, wherein the pre-positioned landing site further includes radar tracking equipment for determining position, velocity, and trajectory of the craft as it approaches the landing site and directs the projecting of the fuel material to a calculated location in relation to the craft.

11. The method as in claim 9, wherein the pre-positioned system also disperses a cloud of the deuterium-containing particle fuel material in the immediate vicinity of the landing site such that generated kinetic-energy-containing products create a braking cushion at the landing site.

12. The method as in claim 1, wherein the deuterium-containing particle fuel material comprises Li6D in the form of solid chips, pellets or powder.

13. The method as in claim 1, wherein the deuterium-containing particle fuel material comprises D20 ice crystals.

14. The method as in claim 1, wherein the deuterium-containing particle fuel material is projected outward from the craft as successive packages configured to disperse the material as a localized cloud at a specified distance from the craft.

15. The method as in claim 14, wherein the packages comprise shell projectiles shot from at least one gun forming a part of the craft, the shells containing chemical explosive therein for dispersing the deuterium-containing fuel material as the localized cloud.

16. The method as in claim 14, wherein the packages also contain up to 20% by weight of added particles of fine sand or dust.

17. The method as in claim 1, wherein the craft having been launched from a first site on the surface of the planet, moon or other space body is receiving decelerating thrust for landing at a second site upon the surface of the same planet, moon or other space body in a site-to-site transport of the craft.

18. The method as in claim 17, wherein the craft was launched from the first site by means of chemical rocket accelerating thrust and is landing at the second site by means of the projecting deuterium-containing particle fuel material that interacts with the ambient flux of cosmic rays, and the receiving by the craft of generated kinetic-energy-containing products.

19. The method as in claim 17, wherein the craft is both launched from the first site and landing at the second site by means of the projecting deuterium-containing particle fuel material that interacts with the ambient flux of cosmic rays, and the receiving by the craft of generated kinetic-energy-containing products.

20. The method as in claim 17, wherein launching of the craft is directed along a track disposed on a ramp structure.

* * * * *